Dec. 4, 1973 D. L. GOFFREDO ET AL 3,776,800

ETCHING APPARATUS

Filed Dec. 8, 1971 2 Sheets-Sheet 1

Dec. 4, 1973 D. L. GOFFREDO ET AL 3,776,800

ETCHING APPARATUS

Filed Dec. 8, 1971 2 Sheets-Sheet 2

United States Patent Office 3,776,800

Patented Dec. 4, 1973

3,776,800
ETCHING APPARATUS

Daniel L. Goffredo, Riverton, N.J., and Conrad Dale Shakley, Spring Mills, Pa., assignors to Chemut Corporation, State College, Pa.

Filed Dec. 6, 1971, Ser. No. 205,202
Int. Cl. H05k 3/06
U.S. Cl. 156—345 8 Claims

ABSTRACT OF THE DISCLOSURE

An etching apparatus is provided, in which articles, such as printed circuit boards and various other types of articles may be etched, within a chamber, during their movement through the chamber of the etching apparatus. Disposed beneath the chamber is a reservoir or sump for collecting etchant, or treatment fluid that is sprayed onto the articles as they are being conveyed through the chamber, with the sump or reservoir extending laterally of that portion of the apparatus directly beneath the chamber, for ease of top access to the reservoir, through a removable access opening therein, for ready access to a removable and replaceable filter disposed within the reservoir, near the inlet to an etchant pump also disposed therein. All of the etchant plumbing is contained within the apparatus, for internal collection of the etchant in the event of leakage or the like.

BACKGROUND OF THE INVENTION

In the manufacture of printed circuit boards, it has become commonplace to provide etching apparatus, whereby, after a mask has been applied to those portions of the board which are not desired to be etched, such as those comprising the circuitry lines of a copper printed circuit board, the remaining portions of the board (generally copper) are treated with an etchant, such as an acid or the like. One suitable etchant is ferric chloride, that is particularly adaptable for the etching of copper from printed circuit boards. The etchant is generally sprayed onto the boards as they pass along a conveyor, through an etching chamber. The etchant is generally delivered to spray nozzles, by means of piping. The etchant has been collected at the lower end of the apparatus, and generally delivered by gravity or by other suitable means, through a pump located externally of the etching apparatus, the pump being driven by a suitable electric motor or the like, and with the outlet of the pump returning etchant under a desired spraying pressure, by suitable distribution lines, such piping or other distribution lines being located, at least in part externally of the etching apparatus.

It has been found, that it is desirable to filter the etchant, as it is being recycled, in that etchant may pick up minor particles, such as dirt or metallic particles or the like, during its spraying process. Accordingly, etchant filters have come to be utilized. In order to achieve sufficient filtration area, such filters have been located internally of the etching apparatus. However, considerable difficulty has been encountered in facilitating removal and replacement of the filters, particularly if it is desired to remove a filter during an etching process, principally because of the location in which it has been necessary to place such filters, beneath a spraying zone.

PRESENT INVENTION

Accordingly, the present invention is directed toward providing an apparatus that will overcome the above features, and permit the removal and replacement of etchant filters, even during an etching process, by locating such filters in an area that is removed from directly beneath the spraying zone, and even more precisely, that is located laterally, outwardly of the remainder of the etching apparatus, for ready access upon opening or removal of an access closure. Furthermore, the present invention mounts the pump internally of the etching apparatus, preferably disposed within the reservoir of etchant, at the lower end thereof, and with the outlet from the pump, as well as all distribution lines to the spray nozzles, being located internally of the etching apparatus, for prevention of leakage problems caused by accidental damage to such distribution lines, and also to facilitate reclamation of etchant in the event of leakage. Thus, the present invention provides an apparatus for containing, internally of itself, the etchant or other treatment liquid, without requiring the conveyance of the same externally of the etching apparatus, such that the complete etchant distribution system is an internal system, relative to the etching apparatus.

SUMMARY OF THE INVENTION

The present invention is therefore directed toward the provision of an etching apparatus having internal etchant delivery and distribution facilities, and for providing access to the filter component of the system, from a laterally outset portion of the apparatus, as well as for providing an internally operative pump.

Accordingly, it is a primary object of this invention to provide a novel etching apparatus.

It is a further object of this invention to provide a novel etching apparatus, wherein access to the etchant reservoir is in a lateral extension of the reservoir.

It is a further object of this invention to provide a novel etching apparatus, having ease of access to a removable and replaceable filter therefor.

It is a further object of this invention to provide a novel etching apparatus, wherein the etchant pump and etchant distribution lines are located internally of the apparatus.

Other objects and advantages of the present invention will be readily apparent to those skilled in the art from a reading of the following brief descriptions of the drawing figures, detailed description of the preferred embodiment, and the appended claims.

IN THE DRAWINGS

Figure 1:
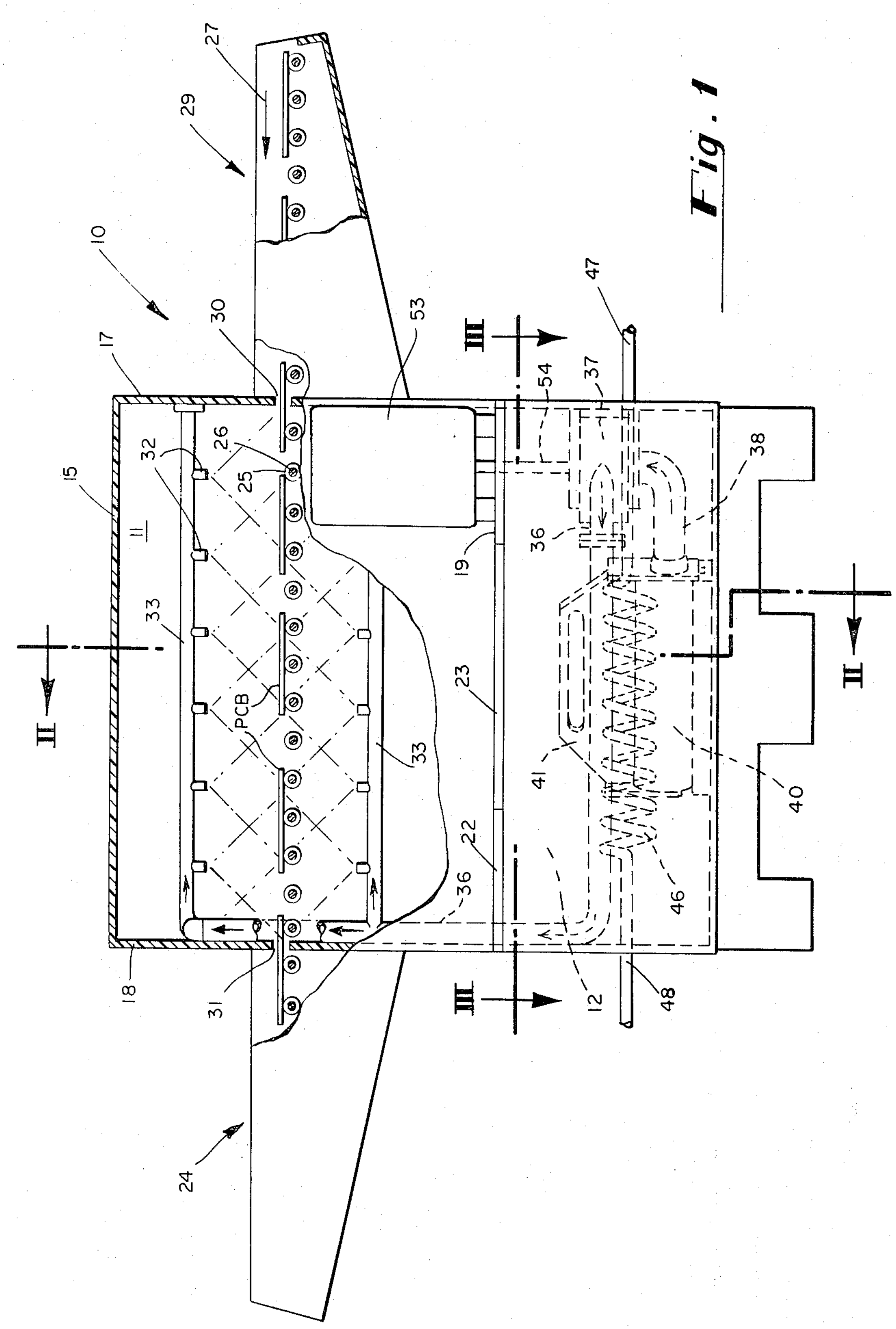
FIG. 1 is a rear elevational view, with portions broken away, of an etching apparatus in accordance with this invention.

FIG. is a fragmentary view, of a portion of the apparatus of this invention, taken generally along the line III—III of FIG. 1.

Referring now to the drawings in detail, reference is first made to FIG. 1, wherein an apparatus of this invention generally designated by the numeral 10, is provided, as including a chamber generally designated by the numeral 11, and a reservoir, generally designated by the numeral 12.

The apparatus 10 is provided with a generally vertically disposed portion 13 of a front wall, and a sloped front wall portion 14, connected thereto, in removable fashion, with the chamber 11 also including an upper or cover portion 15, to which is connected a rear portion 16. It will be apparent that portions 14, 15 and 16 are removable from the remainder of the apparatus 10.

Opposite end walls 17 and 18 are provided for the chamber 11.

Figure 2:
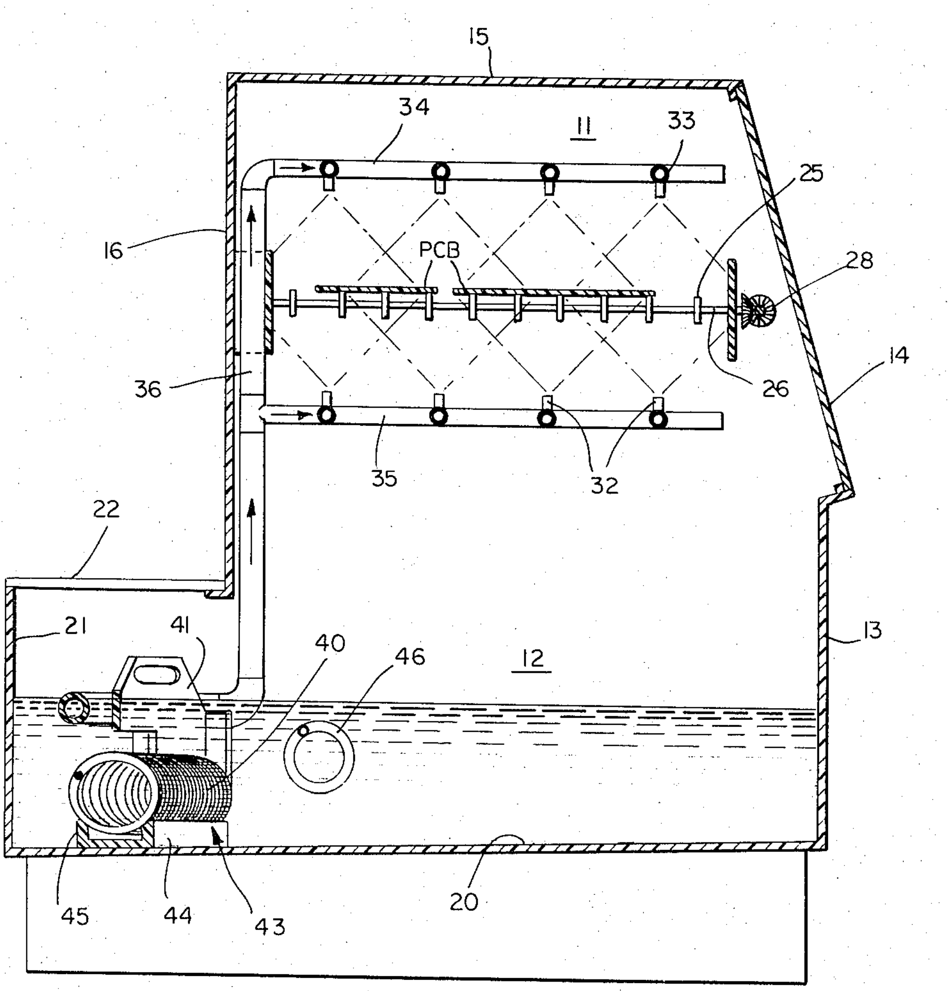
FIG. 2 is a transverse sectional view, of the etching apparatus of this invention, taken generally along the line II—II of FIG. 1.

The reservoir or sump 12 is defined by front wall portions 13, bottom wall portion 20, lower ends of the end-walls 17 and 18, and by a laterally outset rear wall 21, as illustrated in FIGS. 1 and 2. It will be apparent that the apparatus, as viewed particularly in the illustration of FIG. 2, has a cut-out in the upper left hand corner thereof, defined by the rear wall 16 for the chamber 11, and horizontal members 22 and 19, having a removable plate or access closure 23, provided therebetween, for provision of access to the reservoir 12, and to apparatus contained therein.

An inlet apparatus 29 is provided, as well as an outlet apparatus 24, both having suitable rotatably driven conveyor wheels 25 mounted on axis 26 thereof, for driving printed circuit boards or the like over the rollers 25, and in the direction of the arrow 27 indicated in FIG. 1. The axles 26 that have the rollers 25 thereon are driven by suitable gears 28, illustrated in FIG. 2. Accordingly, printed circuit boards PCB are driven from right to left, through the chamber 11, as illustrated in FIG. 1, by rotationally driven roller members 25, passing through an inlet 30 and an outlet 31 of the apparatus 10.

Etchant is delivered to printed circuit boards PCB, through suitable nozzles 32, for spraying the same from above and below, as illustrated in FIG. 2, if desired, with the nozzles 32 being supplied with etchant from delivery lines 33, in turn are supplied from distribution lines 34 and 35, from the outlet 36 of a pump 37 mounted in the reservoir 12, and adapted to remove etchant from the lower end of the reservoir or sump 12, preferably such etchant being delivered toward the inlet 38 of the pump 37, by a sloped floor 20, and with the inlet 38 of the pump 37 being located along the floor thereof. A filter 40 of the generally hollow cylinder, tubular type is provided, having an upstanding, generally vertically disposed handle portion 41, having a handle hole 42 therein, such upper end of the handle portion 41 being disposed just beneath the access opening provided upon removal of the closure 23, as illustrated in FIG. 2, and with a seating means 43 being provided to accommodate the tubular periphery of the filter 40, for maintaining orientation of the filter 40 within the reservoir 12. The seating means 43 is generally provided with upstanding side portions 44 and 45, for engaging the tubular periphery of the filter 40.

It will be noted that a steam coil, or like heating means 46 is provided, between end walls 18 and 17 of the apparatus 10, with suitable inlet and outlet means 47 and 48 being provided therefor, for provision of steam or the like, for heating the etchant to a desired operating temperature.

Figure 3:
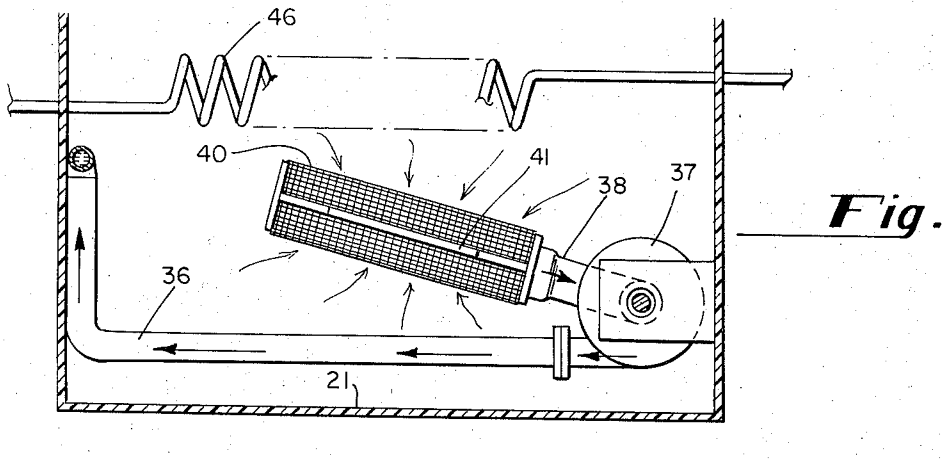

It will be noted that the filter 40 may be connected to the pump inlet 38, by sliding that end of the tubular 40 over the inlet 38 of the pump 37, if desired, or the right-most end of the filter 40, as viewed in FIG. 3 may be disposed adjacent the left-most end of the pump inlet 38, as desired. It will also be noted that the filter 40 is disposed at an angle, as illustrated in FIG. 3, to the wall 21 of the laterally offset portion of the reservoir 12 of the apparatus 10, in order to accommodate the pump 37, and the inflow of etchant to the filter 40.

It will also be noted that channels 50 and 51 are provided at the lower end of the apparatus 10, that extend clear across the apparatus, as illustrated in FIG. 2, in order to accommodate a forklift truck or the like, for movement of the apparatus 10 about.

It will further be noted that the pump 37, as well as the inlet 38, and outlet 36, and also distribution lines 35, 34 and 33, are all located internally of the apparatus 10, such that any leakage therefrom would fall into the reservoir or sump portion 12 of the apparatus 10. It will further be noted that, because of the nature of the etchant (generally ferric chloride) the various materials of construction of the distribution lines will be various forms of acid-resistant metals and plastics, such as polyvinylchloride and titanium, all within the skill of the art.

It will also be noted that a suitable drive is provided for the gears 28, as well as a suitable electric motor 53 being provided for operating the pump 37, the motor 53 being mounted externally of the apparatus 10, above the pump 37, and above the member 19 that covers the right-most end of the rear of the laterally extended portion of the sump or reservoir 12, as illustrated in FIG. 1, with the motor 53 being connected to the pump 37 by a suitable drive rod 54 extending through the member 19, to the pump 37.

It will also be apparent that suitable provision for operating the motor 53, such as electric supply lines or the like are necessary, as well as various controls and valves being desirable, for the operation of the etchant supply and distribution lines, and spray valves forming components of the etchant spraying system.

It will further be apparent to those skilled in the art that, while the apparatus is disclosed as being particularly adapted for use with an "etchant," other types of liquids may be employed in an apparatus constructed in accordance with this invention, such as various treatment liquids, etchant removal liquids, rinsing liquids and the like, all within the spirit and scope of the invention, as recited in the appended claims.

What is claimed is:

1. An etching apparatus adapted for the spraying of a liquid etchant onto articles conveyed therethrough, comprising an etching chamber, means for conveying articles to be etched through the chamber along predetermined paths, spraying means disposed in said chamber and positioned for spraying articles delivered along the paths, etchant reservoir means disposed at an elevation below the chamber and spraying means located therein, said reservoir means having at least a portion at substantially the same reservoir elevation, extending laterally of said chamber relative to a generally forward direction of conveyance of articles along the predetermined paths, said laterally extending portion being substantially free of conveying means disposed thereabove, with pump means being provided for delivering etchant from the reservoir means to said spraying means, wherein an openable top access means is provided to said reservoir, located in a said lateral extension portion thereof, with said pump means having an inlet means located in said lateral extension portion of said reservoir means, and with removable etchant filter means being provided in the bottom of said reservoir at the inlet to said pump means, also located in said reservoir means in said lateral extension portion.

2. The apparatus of claim 1, wherein said pump means is of the submerged type and is located in the bottom of said reservoir means in said lateral extension portion, and with etchant delivery line means being provided between said pump and said spraying means, said delivery line means being located internally of said reservoir means and said chamber.

3. The apparatus of claim 2, including motor drive means for said pump means, said motor drive means being mounted externally of and above said reservoir means, laterally of said chamber.

4. The apparatus of claim 1, wherein said pump means is of the submerged type and is in the bottom of said reservoir means in said lateral extension portion.

5. The apparatus of claim 4, wherein said filter means is provided, with a handle extension portion, protruding generally vertically upwardly to a position just beneath said top access means.

6. The apparatus of claim 5, wherein said filter means is removably carried in a filter seat, said seat being carried on the bottom of said reservoir means.

7. The apparatus of claim 1, wherein said chamber and said reservoir means are closed for containing etchant and etchant vapors therein, with said access means comprising a removable closure.

8. The apparatus of claim 6 wherein said chamber and said reservoir means are closed for containing etchant and etchant vapors therein, with said access means comprising a removable closure.

References Cited

UNITED STATES PATENTS 3,419,446 12/1968 Benton ............ 156—345

FOREIGN PATENTS 473,349 10/1937 Great Britain ........ 134—182

JACOB H. STEINBERG, Primary Examiner

U.S. Cl. X.R.

134—104, 111